United States Patent
Caglin et al.

(10) Patent No.: US 10,132,557 B2
(45) Date of Patent: Nov. 20, 2018

(54) HOME APPLIANCE DEVICE

(71) Applicant: BSH-HAUSGERAETE GMBH, Munich (DE)

(72) Inventors: Muharrem Uemit Caglin, Istanbul (TR); Mehmet Ciyanoglu, Istanbul (TR); Tanzer Yildizgoecer, Tekirdag (TR)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/363,015

(22) Filed: Nov. 29, 2016

(65) Prior Publication Data

US 2018/0149417 A1    May 31, 2018

(51) Int. Cl.
| | |
|---|---|
| *F25D 25/02* | (2006.01) |
| *F25D 23/02* | (2006.01) |
| *F25D 23/08* | (2006.01) |
| *F25D 23/06* | (2006.01) |

(52) U.S. Cl.
CPC .......... *F25D 25/02* (2013.01); *F25D 23/028* (2013.01); *F25D 23/069* (2013.01); *F25D 23/087* (2013.01); *F25D 2201/12* (2013.01)

(58) Field of Classification Search
CPC ...... F25D 25/02; F25D 23/028; F25D 23/069; F25D 23/087; F25D 2201/12
See application file for complete search history.

(56) References Cited

U.S. PATENT DOCUMENTS

| | | | | |
|---|---|---|---|---|
| 2,363,530 | A * | 11/1944 | Iwashita | F25D 11/02 220/592.09 |
| 2,434,117 | A | 1/1948 | Money et al. | |
| 2,584,089 | A * | 1/1952 | Hillenbrand | A47B 79/00 312/213 |
| 3,407,016 | A * | 10/1968 | Kronenberger | F25D 21/14 312/229 |
| 4,330,310 | A | 5/1982 | Tate, Jr. et al. | |
| 4,780,597 | A | 10/1988 | Linhart et al. | |
| 6,290,314 | B1 * | 9/2001 | Kim | F25D 23/069 312/296 |
| 6,779,357 | B1 * | 8/2004 | Fann | F25D 21/14 62/285 |
| 2001/0050521 | A1 * | 12/2001 | Maritan | F25D 23/025 312/408 |

(Continued)

FOREIGN PATENT DOCUMENTS

| | | | |
|---|---|---|---|
| JP | 06018156 | A * | 1/1994 |
| JP | H063033 | A | 1/1994 |

(Continued)

*Primary Examiner* — Hanh V Tran
(74) *Attorney, Agent, or Firm* — Laurence A. Greenberg; Werner H. Stemer; Ralph E. Locher

(57) ABSTRACT

For the purpose of improving efficiency a home appliance device, in particular a home chiller appliance device, is proposed. The device has a housing defining a storage space; a home appliance door configured for closing off the storage space; and an insert which is insertable into the storage space and has a base unit and an insulation element arranged in a vicinity of a corner of the base unit in a closed state of the home appliance door, wherein the insulation element at least partly insulates a further intermediate space between the base unit and the home appliance door in the closed state.

13 Claims, 5 Drawing Sheets

(56) References Cited

U.S. PATENT DOCUMENTS

| | | | | |
|---|---|---|---|---|
| 2004/0172964 A1* | 9/2004 | Brachert | ............... | F25D 23/069 |
| | | | | 62/407 |
| 2005/0138955 A1* | 6/2005 | Okuda | ................. | F25D 23/025 |
| | | | | 62/441 |
| 2007/0033960 A1* | 2/2007 | Egan | ..................... | F25D 23/02 |
| | | | | 62/389 |
| 2007/0062226 A1* | 3/2007 | Gomoll | ................ | A47F 3/0434 |
| | | | | 68/34 |
| 2009/0308094 A1* | 12/2009 | Gorz | ................... | F25D 17/065 |
| | | | | 62/264 |
| 2010/0307065 A1* | 12/2010 | Eckartsberg | ........ | F25D 23/087 |
| | | | | 49/475.1 |
| 2015/0252603 A1* | 9/2015 | Cianetti | ................. | E05D 13/14 |
| | | | | 49/119 |
| 2016/0047592 A1* | 2/2016 | Rolek | ................... | A47F 3/0426 |
| | | | | 312/406.1 |

FOREIGN PATENT DOCUMENTS

| | | | | |
|---|---|---|---|---|
| JP | 10220958 | A | * | 8/1998 |
| JP | 2007047899 | A | * | 2/2007 |

* cited by examiner

HOME APPLIANCE DEVICE

BACKGROUND OF THE INVENTION

Field of the Invention

The invention relates to a home appliance device, in particular a home chiller appliance device and a method for manufacturing a home appliance device.

SUMMARY OF THE INVENTION

An objective of the invention is, in particular, to provide a home appliance device with improved characteristics regarding efficiency. This objective is achieved, according to the claimed invention. Further implementations and further developments of the invention may be gathered from the dependent claims.

In one aspect of the invention, which may in particular be considered in combination with as well as separately from other aspects of the invention, a home appliance device, in particular a home chiller appliance device, is proposed comprising: an insert which is insertable into a storage space and which has a front cover element and a cover support element, wherein the front cover element is connected to the cover support element in a form-fit manner in at least one first direction and is in at least one pre-assembly state movable with respect to the cover support element in at least one second direction that is perpendicular to the first direction.

By means of this aspect of the invention in particular efficiency, in particular efficiency of an assembly and/or connectability, of the home appliance device can be improved. In particular a design of the home appliance device may be improved as parting lines and edges may be covered by means of the front cover element. In particular a user safety can be improved as edges can be covered. Furthermore, cleaning of the home appliance device can be facilitated.

In this context, "configured" is in particular to mean specifically programmed, designed and/or equipped. By an object being configured for a certain function is in particular to be understood that the object implements and/or fulfills said certain function in at least one application state and/or operating state. A "home appliance device" is in particular to be understood as a portion, in particular a sub-assembly group, of a home appliance. The home appliance is, in this context, in particular provided for storing and preferably tempering victuals such as beverages, in particular alcoholic beverages such as wine, meat, fish, vegetables, fruits, milk and/or dairy products in at least one operating state, in particular for the purpose of enhancing a quality and/or a storage life of the stored victuals. For example, the home appliance is embodied as a home chiller appliance, which is in at least one operating state configured for cooling victuals. The home chiller appliance could in particular be embodied as a climate cabinet, an ice-box, a wine-cooler, a freezer and/or a refrigerator-freezer combination. For example, the home chiller appliance is embodied as a refrigerator. However, the home appliance could also be embodied as a home appliance for warming up and in particular for cooking victuals, e.g. an oven, a cooker and/or a microwave.

The storage space may in particular be defined by a housing of the home appliance device, in particular an inner liner of the home appliance device. The storage space may in particular be a space inside the home appliance device, which is provided for storing victuals and which may in particular be delimited by an inner liner of the home appliance device. The storage space may in particular be at least partly divisible into at least two storage areas, in particular a plurality of storage areas. In particular in an installed state, the insert may divide the storage space into at least two storage areas. The insert may in particular be configured for storage of victuals. The insert may in particular be implemented as a shelf, preferably an at least partly transparent shelf, e.g. made of glass and/or of a transparent plastic, as a cover for a drawer, which is in particular configured for adjusting humidity in the drawer, a bottle holder and/or a dividing plate.

The insert may comprise in particular a base unit. The base unit may in particular comprise a deposition element onto which victuals can be placed. Further the base unit may comprise in particular at least one base support element which is configured for stabilizing the insert, at least one insulation element and/or a bottom cover, which may close the insert off to a bottom side. The insert, in particular the base unit of the insert, may have in particular a main extension plane, which may at least substantially be parallel to a horizontal plane of the home appliance device. In this context, a "horizontal plane" is in particular to be understood as a main extension plane of a base onto which the home appliance device is installed in an installed state. A "main extension plane" of an object is, in particular, to be understood as a plane extending parallel to a largest side of an imaginary rectangular cuboid which only just entirely encloses the object and preferably extends through a geometric center of the object. In this context "at least substantially parallel" is in particular to be understood as an orientation of a direction with respect to a reference direction, in particular in a plane, wherein the direction and the reference direction include an angle of 0°, the orientation in particular having a deviation of less than 15°, advantageously of less than 10° and particularly advantageously of less than 2°. Further, the main extension plane of the insert may at least be substantially perpendicular to a main extension direction of the home appliance device. A "main extension" of an object is, in particular, to be understood as a largest extension of an imaginary rectangular cuboid which only just entirely encloses the object and which preferably extends through a geometric center of the object. The insert may in particular comprise a frame by means of which further components of the insert are at least partly or at least mostly or entirely connected to each other and which may in particular be configured for mounting the insert to the housing, in particular to the inner liner, of the home appliance device.

The front cover element may constitute a front side of the insert, in particular of the base unit, and may cover in particular at least the cover support element in a direction towards a home appliance door of the home appliance device. In particular a main extension of the front cover and/or of the cover support element may in particular be at least substantially perpendicular to the first direction and in particular at least substantially parallel to the second direction. In this context "at least substantially perpendicular" is in particular to be understood as an orientation of a direction with respect to a reference direction, in particular in a plane, wherein the direction and the reference direction include an angle of 90°, the orientation having in particular a deviation of less than 15°, advantageously of less than 10° and particularly advantageously of less than 2°. In particular the main extensions of the cover element and the front cover support element are at least substantially parallel to one another.

Additionally the front cover element may be connected to the cover support element in a force-fit manner. By the term "connected in a force-fit and/or form-fit manner" is in particular to be understood preferably releasably connected, wherein a holding force between two structural components is preferably transferred via a geometric engagement of the structural components with each other and/or preferably via a friction force acting between the structural components. Alternatively or additionally a connection may be provided by substance-to-substance bond, preferably an adhesive and/or cohesive connection.

In addition the front cover element may be connected to the cover support element in a form-fit manner and/or in a force-fit manner in at least one third direction. The first direction is in particular at least substantially perpendicular to the main extension of the insert in an installed state. The second direction is in particular at least substantially parallel to the main extension of the insert in an installed state. The third direction is in particular at least substantially parallel to the main extension plane of the insert and preferably at least substantially perpendicular to the first direction and/or the second direction.

In particular a rear side of the front cover element may at least partially or at least mostly or entirely be shaped correspondingly to a front side of the cover support element. In this context, "a first object being shaped correspondingly to a second object" is in particular to mean that the second object is at least partly shaped correspondingly to the second object. In particular the first object is a negative of the second object. The term "at least mostly" with reference to an object is in particular to mean by more than 50%, preferably more than 65%, further preferably more than 80% and advantageously more than 95% of an object, in particular a surface area, preferably a volume and/or a mass of the object.

Further, it is proposed that the cover support element may comprise a first guiding element and the front cover element may comprise a corresponding second guiding element, wherein the first guiding element and the second guiding element cooperate to connect the front cover element to the cover support element in a form-fit manner. Further, the cover support element may comprise at least one further first guiding element and the front cover element may comprise at least one corresponding further second guiding element. The first guiding elements and/or the further first guiding elements may in particular be implemented integrally with each other and/or may be implemented integrally with the cover support element. The second guiding elements and/or the further second guiding elements may in particular be implemented integrally with each other and/or may be implemented integrally with the front cover element. "Implemented integrally" is in particular to mean, in this context, connected at least by substance-to-substance bond, e.g. by a welding process, an adhesive bonding, an injection-molding process and/or by another process that is deemed expedient by a person having ordinary skill in the art. For example, "implemented integrally" could in particular mean made of one piece. "Made of one piece" is, in particular, to mean, in this context, manufactured from one single piece, e.g. by production from one single cast and/or by manufacturing in a one-component or multi-component injection-molding process, and in particular from a single blank. The cover support element comprises in particular a base body which at least partly or at least mostly or entirely embodies the first guiding element and if present in particular the further first guiding element. The front cover element comprises in particular a base body which at least partly or at least mostly or entirely embodies the second guiding element and if present in particular the further second guiding element. In this way in particular an assembly of the home appliance device can be further simplified.

For the purpose of improving a form-fit connection, it is proposed that a projection of the first guiding element in a main extension direction of the cover support element and a projection of the second guiding element in a main extension direction of the front cover element may be shaped at least substantially complementarily. In particular the first guiding element and the second guiding element may contact each other along their respective main extensions at least twice or at least three times or at least multiple times. Most of a surface of the cover support element and in particular of the first guiding element, which faces the front cover element in an installed position, may contact at least mostly and in particular entirely a surface of the front cover element, in particular of the second guiding element, which faces the cover support element.

In an implementation of the invention it is proposed that the first guiding element may have a uniform cross-section along the main extension direction of the coyer support element. In particular, the entire cover support element may have a uniform cross-section along the main extension direction of the cover support element. It is also proposed that the second guiding element may have a uniform cross-section along the main extension direction of the front cover element. In particular, the entire front cover element may have a uniform cross-section along its main extension direction. As a result of this, in particular an assembly can be further improved. In particular, a form-fit connection of the cover support element and the front cover element may be further improved. In addition manufacturing of the cover support element and the front cover element may be improved, as they may be designed as negatives of one another.

In order to improve a stability of the form-fit connection, it is proposed that the first guiding element and/or the second guiding element may at least partly have an at least substantially T-shaped cross-section. In this context "an object being at least substantially T-shaped" is in particular to be understood as an object which comprises a first portion and a second portion which is preferably arranged directly adjacent to the first portion and which extends in two directions which are at least substantially perpendicular to a main extension of the first portion and are in particular antiparallel with respect to each other. Furthermore, the further first guiding element and/or the second guiding element may at least partly have an at least substantially L-shaped cross-section. In this context "an object being at least substantially L-shaped" is in particular to be understood as an object which comprises a first portion and a second portion which is preferably arranged directly successively to the first portion and which extends in only one direction which is at least substantially perpendicular to a main extension of the first portion.

Furthermore, it is proposed that the front cover element may have a main extension which is longer than a main extension of the cover support element. In particular the main extension of the front cover element may by at least 1% or by at least 2% or by at least 5% or by at least 10% longer than the main extension of the cover support element. As a result of this, in particular the cover support element may be fully covered by the front cover element. In particular, parting lines and preferably sharp corners of the cover support element may be hidden from the eye of a user.

It is also proposed that the insert may comprise a lateral element, which may at least partly embody a lateral frame element of the insert. Furthermore, the insert may comprise in particular a further lateral element, which may at least partly embody a further lateral frame element of the insert and which may in particular be arranged opposite the lateral frame element. The lateral element may in particular be connected to the front cover element in a form-fit manner and/or in a force-fit manner in at least one first direction and may in at least one pre-assembly state be movable with respect to the cover support element in at least one second direction that is perpendicular to the first direction. In particular, the lateral element, in particular a cross-section of the lateral element, may at least be partially or at least mostly or entirely shaped equivalently to the cover support element, in particular a cross-section of the cover support element, and in particular be shaped equivalently to the front cover element, in particular to a cross-section of the front cover element. The lateral element may comprise in particular a third guiding element which may correspond to the second guiding element of the front cover element and may in particular be shaped equivalently to the first guiding element of the cover support element. The third guiding element and the second guiding element may in particular cooperate to connect the lateral element to the front cover element in a form-fit manner. The lateral element may comprise in particular a further third guiding element which corresponds to the further second guiding element of the front cover element and is advantageously equivalent to the further first guiding element of the cover support element. The further third guiding element and the further second guiding element in particular cooperate to connect the lateral element to the front cover element in a form-fit manner. The third guiding element and/or the further third guiding elements may in particular be implemented integrally with each other and/or may be implemented integrally with the lateral element. The lateral element may comprise in particular a base body which at or entirely embodies the third guiding element and if present the further third guiding element. In particular a projection of the second guiding element in a main extension direction of the front cover element and a projection of the third guiding element in parallel to the second direction may be shaped at least substantially complementarily. The second guiding element and the third guiding element may contact each other in particular along their respective main extensions at least twice or at least three times or at least multiple times. In particular most of a surface of the front cover element, and in particular of the second guiding element, which faces the lateral element in an installed position, may contact at least mostly and in particular entirely a surface of the lateral element, in particular of the third guiding element, which faces the front cover element. In particular the third guiding element may have a uniform cross-section along the main extension direction of the front cover element. In particular, the lateral element may have a uniform cross-section along the second direction. In particular the third guiding element may have a uniform cross-section along the second direction. The third guiding element may have in particular at least partly an at least substantially T-shaped cross-section. In particular, a projection of the further second guiding element in a main extension direction of the front cover element and a projection of the further third guiding element in parallel to the second direction may be shaped at least substantially complementarily. The further second guiding element and the further third guiding element may contact each other along their respective main extensions at least twice or at least three times or at least multiple times. In particular, most of a surface of the further second guiding element, and in particular of the front cover element, which faces the lateral element in an installed position, may contact at least mostly and in particular entirely a surface of the lateral element, in particular of the further third guiding element, which faces the cover support element. In particular the further third guiding element may have a uniform cross-section along the main extension direction of the front cover element. In particular the further third guiding element may have a uniform cross-section along the second direction. The further third guiding element may have in particular at least partly an at least substantially L-shaped cross-section.

Furthermore, it is proposed that the front cover element may have a main extension which is longer than an extension of the lateral element parallel to the second direction. It is conceivable that the lateral element and/or the further lateral element may at least partly be implemented integrally with the cover support element, wherein preferably the first guiding element and the third guiding element are implemented integrally. As a result of this, a stability of the insert may be increased. In order to be able to specifically design the lateral element and cover support element, it is proposed that the lateral element and cover support element may be separate elements. The lateral element and the further lateral element may also be separate elements.

In a further implementation of the invention it is proposed that the main extension of the front cover element may at least substantially be equal to the main extension of the cover support element plus at least twice or exactly twice, an extension of the lateral element, which is in particular given by adding the extensions of the lateral element and the further lateral element in parallel to the second direction. In this context, "at least substantially equal" is in particular to mean equal except for production and manufacturing tolerances of in particular at most 10%, preferably at most 5% and advantageously at most 2%. As a result, a flush design of the insert can be achieved.

In addition, it is proposed that the lateral element may comprise a stopper for a seal, for example a sealing lip, of the insert, wherein the seal may be connected to the front cover element and/or to the cover support element and may be provided for sealing an intermediate space between the base unit and a home appliance door in the closed state. In particular, the further lateral element may comprise a further stopper. In particular the seal may in an installed state be connected to the front cover element and/or the cover support element in a form-fit manner and/or a force fit manner. The front cover element and/or the cover support element may in particular comprise an additional guiding element which connects the seal, e.g. the sealing lip, in a form-fit manner. In particular, during assembly the seal, e.g. sealing lip, may be slid inside the additional guiding element in the second direction. In particular, the seal may be fixed between the stopper and the further stopper in a form-fit manner and/or a force-fit manner. In particular the stopper and/or the further stopper prevent movement of the seal along the second direction. The seal may in particular made of plastic or rubber. As a result of this in particular a sealing effect between the insert and a home appliance door, in particular in order to divide the storage space into different storage areas, can be enhanced. An assembly and/or fixation of the seal, e.g. in form of a sealing lip, can be improved.

The cover support element may be connected to at least one or at least two or at least several further elements of the insert, in particular to plate-shaped elements of the insert, for example a top plate and/or a bottom plate and/or base plate.

In particular the cover support element may attach several further elements of the insert to each other. In particular the further elements may be connected to a rear side of the cover support element facing away from the front cover element.

For the purpose of increasing an efficiency of a manufacturing process, it is proposed that the front cover element and/or the cover support element may be manufactured by extrusion. The lateral element and/or the further lateral element may be manufactured by injection molding or by extrusion. In particular the extrusion may be carried out as a plastic or metal extrusion process. As a result, in particular a fabrication of the insert can be improved. In this way preferably fabrication costs can be reduced.

The front cover element may at least partly or at least mostly or entirely be made of metal. Alternatively or additionally the front cover element may be at least partly or mostly or entirely be made of plastic, wood and/or glass. The cover support element, the lateral element and/or the further lateral element may at least partly or at least mostly or entirely be made of plastic. Alternatively or additionally the cover support element, the lateral element and or the further lateral element, may at least partly or at least mostly or entirely be made of metal, wood and/or glass. As a result, in particular a stability of the home appliance device can be improved. In particular by a choice of material a design can be enhanced and advantageously customized according to a customer's request.

In another aspect of the invention a method for manufacturing the home appliance device, in particular a home chiller appliance device, comprising an insert which is insertable in a storage space and has a front cover element and a cover support element, is proposed, wherein the front cover element is moved with respect to the cover support element in at least one second direction, whereby the front cover element is connected to the cover support element in a form-fit manner in at least one first direction that is perpendicular to the second direction. As a result of this, in particular a manufacturing process of the home appliance device can be carried out more efficiently. Advantageously an efficiency of an assembly and/or connectability of the home appliance device can be improved.

The home appliance may in particular comprise a seal and an insulation element as described thereafter, wherein the method for manufacturing also comprises the step of pushing the seal into an additional guiding element of the cover support element along the second direction. Additionally, the method for manufacturing may also comprise the step of pushing an insulation element, in particular an insulation element being integrally formed by a lateral frame element, along the third direction before pushing the seal into the additional guiding element of the cover support element along the second direction.

In a further aspect of the invention, which may in particular be considered in combination with as well as separately from other aspects of the invention, a home appliance device, in particular a home chiller appliance device, is proposed comprising: a housing defining a storage space; a home appliance door configured for closing off the storage space; and an insert which is insertable into the storage space and has a base unit and an insulation element arranged in a vicinity of a corner of the base unit in a closed state of the home appliance door, wherein the insulation element at least partly insulates an intermediate space between the base unit and the home appliance door in the closed state.

By means of this aspect of the invention, in particular an efficiency, in particular a tempering efficiency, can be increased. In particular a sealing of different storage areas can be improved and air circulation between different storage areas can be reduced.

In this context, the phrasing "the insulation element at least partly insulates an intermediate space between the base unit and the home appliance door in the closed state" is in particular to mean that the insulation element at least partly or at least mostly reduces or entirely seals an intermediate space between the base unit and a home appliance door in the closed state. In this context "a vicinity of a corner" is in particular to be understood as a spherical area around the corner having a radius of at most 10 cm or at most 5 cm or of at most 2 cm.

The insulation element may at least partly or at least mostly or entirely be implemented integrally with the lateral element.

Furthermore, it is proposed that the insulation element may have a contact surface which contacts at least partly or at least mostly or entirely the home appliance door in its closed state. As a result of this, in particular an insulation effect can be further enhanced.

It is also proposed that the insulation element may at least partly be deformable and is at least partly deformed by the home appliance door in its closed state. In this context, "deformable" is in particular intended to mean elastically deformable, preferably reversibly deformable and in particular repeatedly reversibly deformable. The insulation element may in particular be deformable due to its design and/or due to its material characteristics. In case the insulation element may be deformable due to its design, the insulation element may be made at least partly or at least mostly or entirely of a thermoplastic material. The insulation element may in particular be deformable due to its design by being implemented with a contact surface facing the door in a closed state of the door wherein the contact surface is deflectable, in particular deflectable essentially perpendicular to a main extension of the door, for example essentially deflectable along the third direction. The insulation element may in particular be deformable due to its design by being implemented with a first section and a second section, whereas the first section may be in contact with the door in a closed state of the door and whereas this first section will essentially be not deformed in a closed state of the door, whereas the second section which is not in contact with the door in a closed state of the door will be deformed in a closed state of the door. The first section may, however, change its position in a closed state of the door compared to an opened state of the door, in particular the first section will be deflected. By being deformable due to its design, the insulation element may achieve in its deformed state, i.e. in the closed state of the door, a large contact surface with the door, in particular over a long period of use of the home appliance device and/or essentially independent of manufacturing and/or assembly tolerances regarding for example the insert or the door. In particular a contact surface of the insulation element may in the deformed state be in surface contact with a corresponding contact surface of the door (rather than being in line or point contact).

The insulation element may additionally or alternatively be deformable due to its material characteristics by being made at least partly or at least mostly or entirely of a deformable material which comprises an elastic modulus of at most 10 GPa or at most 5 GPa or of at most 1 GPa or of at most 0.1 GPA. The insulation element may in particular at least partly, or at least mostly or entirely made of a thermoplastic material, a duroplastic material and/or an elastomer. In particular the insulation element may in particular at least partly be made of plastic, rubber and/or silicone. As a result of this in particular a sealing effect can be augmented.

In particular in an opened state of the door the insulation element may be in an undeformed state. In a closed state of the door the insulation material may be in a deformed state. In the closed state of the door an inner surface of the door, in particular an inner surface of a door frame, may contact the insulation element an elastically deform it. This elastic deformation takes place once the door is being closed and the inner surface gets into contact with a contact surface of the insulation element facing the door. The inner surface of the door may protrude along the second direction from the left and/or right side of the home appliance device inwardly to such an extent that it contacts the contact surface of the insulation element but does not contact a seal being positioned at the insert further inwardly along the second direction.

For the purpose of improving an insulation effect of the home appliance device, it is proposed that the insulation element may at least partly embody a corner of the insert.

In a further implementation of the invention it is also proposed that the insulation element may comprise a recess which is configured for receiving a seal of the insert, in particular during the assembly of the insert. During assembly the seal, in particular a foot of the seal, may be pushed through the recess whereby the seal may be pushed into a additional guiding element of the cover support element. In particular in order to push the seal via the recess into the additional guiding element the insulation element may be pushed along the third direction backwards, e.g. towards a rear end of the insert facing away from the door, in which case the insulation element is elastically deformed. The insulation element may be deformable to such an extent that the recess is essentially aligned with the additional guiding element, whereas in particular the recess and the additional guiding element may be aligned in this state parallel with respect to the second direction. In an undeformed state of the insulation element, the recess may be co-axial and/or not aligned with the additional guiding element, whereas in particular the recess and the additional guiding element in this state may be aligned parallel with respect to the second direction. In an assembled state of the insert and an opened state of the door the recess extends essentially parallel to the second direction and/or extends along the second direction. In an assembled state of the insert the seal may be located beside the recess, in particular along the second direction. In particular when the insert comprises two insulation elements, the seal may be located in between both insulation elements along the second direction, in particular end sections of the seal may abut or contact the respective insulation elements.

In a further implementation of the invention it is also proposed that the insulation element may comprise a recess which is configured for receiving a sealing element of the insert in an assembled state of the insert. By means of the recess the sealing element may be connected to the insulation element in a form-fit manner and/or a force-fit manner. The sealing element may in particular be configured for sealing the intermediate space between the insert and the home appliance door, in particular in a vicinity of the corner of the base unit, at least partly or at least mostly or entirely waterproof and/or airproof. Alternatively or additionally the sealing element may be integrally implemented with the insulation element and/or with a seal. As a result of this, in particular a circulation of air between storage areas can be reduced. Furthermore, the sealing element may be mounted in a simple manner.

In a further implementation of the invention it is proposed that the sealing element may have a greater deformability than the insulation element. In this context, by an object having "a greater deformability" than another object is in particular to be understood that the objects differ in regard to their deformability, preferably due to design and/or material characteristics, such as an elastic modulus. In particular, the elastic modulus of the sealing element is in particular by at least 10% or by at least 30% or by at least 50% or by at least 70% smaller than the elastic modulus of the insulation element. In particular, the insulation element is at least partly made of plastic. As a result, a flexibility of the sealing element may be improved. In particular the sealing element may be adjusted to manufacturing and or production tolerances and in particular to changes during a lifetime of the home appliance device.

It is also proposed that the insert may comprise a lateral element, which may embody at least partly a lateral frame element of the insert. In particular the lateral element may comprise a stopper for a seal, e.g. a sealing lip, of the insert, wherein the seal may be connected to the front cover element and/or the cover support element and may be provided for sealing a further intermediate space between the base unit and the home appliance door in the closed state. In particular the insulation element may embody the stopper. As a result, a flush design of the insert can be achieved.

Herein the home appliance device is not to be limited to the application and implementation described above. In particular, for the purpose of fulfilling a functionality herein described, the home appliance device may comprise a number of respective elements, structural components and units that differs from the number mentioned herein. Furthermore, regarding the value ranges mentioned in this disclosure, values within the limits mentioned are to be understood to be also disclosed and are to be used as applicable.

Further advantages may become apparent from the following description of the drawing. In the drawing an exemplary embodiment of the invention is shown. The drawing, the description and the claims contain a plurality of features in combination. A person having ordinary skill in the art will purposefully also consider the features separately and will find further expedient combinations.

If there is more than one specimen of a certain object, only one of these is given a reference numeral in the figures and in the description. The description of this specimen may be correspondingly transferred to the other specimens of the object.

DETAILED DESCRIPTION OF THE INVENTION

Figure 1:
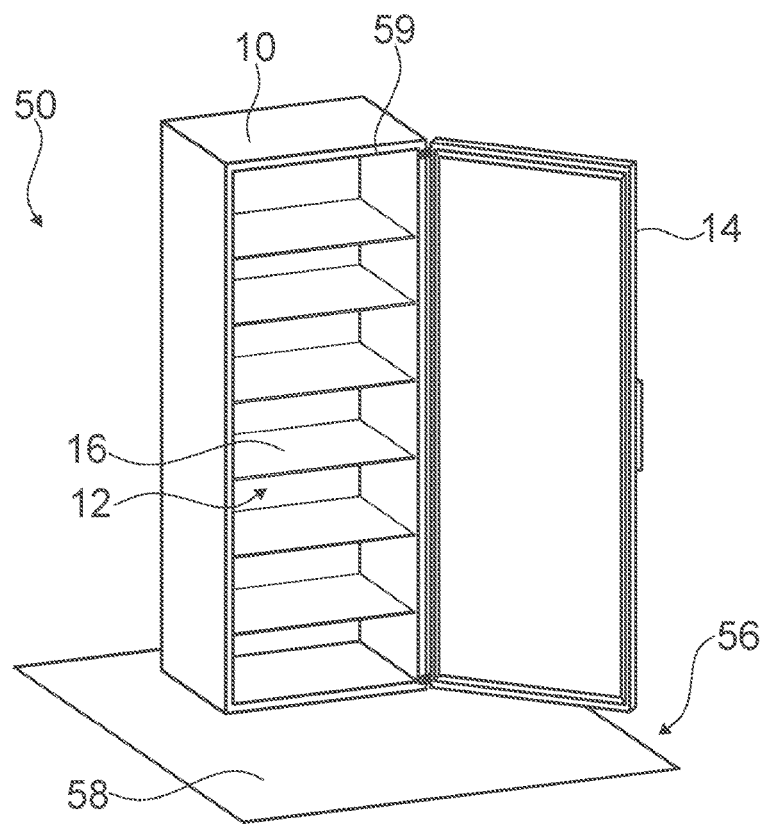
FIG. 1 a home appliance comprising a home appliance device in a schematic perspective view, FIG. 2 a portion of the home appliance device, comprising an insert having a base unit, in a perspective view, FIG. 3 a portion of the home appliance device, comprising the insert having a base unit and a frame, in a exploded view, FIG. 4 a portion of the home appliance device, comprising the frame in a disassembled state, in a cross-section view, FIG. 5 a portion of the home appliance device, comprising the frame in an assembled state, in a cross-section view, FIG. 6 a portion of the home appliance device, comprising the frame in an assembled state, in perspective view, and FIG. 7 a portion of the home appliance device in a closed state of a home appliance door of the home appliance device, in a cross-section view.

FIG. 1 shows a home appliance 50 comprising a home appliance device, in a schematic perspective view. The home appliance 50 is embodied as a refrigerator. The home appliance 50 could further be embodied as any other home appliance deemed advantageous by someone skilled in the art, e.g. a climate cabinet, an ice-box, a freezer, a wine-cooler and/or a refrigerator-freezer combination.

In FIG. 1 the home appliance device is shown in an installed state. The home appliance device is installed on a base 56. The base 56 defines a horizontal plane 58. The home appliance device comprises a housing 10. The housing 10 is installed upright on the base 56. The housing 10 comprises an inner liner 59. The inner liner 59 defines a storage space 12. The home appliance device further comprises a home appliance door 14. The home appliance door 14 closes off the housing 10 in a closed state.

The home appliance device comprises at least one insert 16. In the present case the home appliance device comprises six inserts 16. For the sake of clarity, in the following only one insert 16 is given a reference numeral and is described in detail. The following description may be applied to further inserts 16 accordingly. It is conceivable that the home appliance device may comprise a deviating number of inserts 16 as is deemed advantageous by someone skilled in the art. In this case the insert 16 is embodied as a dividing plate. The home appliance device may preferably comprise a combination of different embodiments of inserts 16, for example at least one insert 16 embodied as a dividing plate and at least one further insert 16 embodied as a bottle holder.

The insert 16 divides the storage space 12 into storage areas. The insert 16 is insertable into the storage space 12. The insert 16 comprises a base unit 18. The insert 16, preferably the base unit 18, has a main extension plane which is oriented at least substantially parallel to a horizontal plane 58 of the home appliance device. The base unit 18 comprises a deposition element 60. The deposition element 60 is configured for depositing victuals. The deposition element 60 closes the insert 16 off to a top side. Further the base unit 18 comprises at least one base support element 62. The base support element 62 is configured for stabilizing the insert 16. The base unit 18 comprises at least one insulation element 64. The insulation element 64 is configured for preventing a heat transfer from one storage area of the storage space 12 to another storage area. The base unit 18 comprises a bottom cover 66. The bottom cover 66 closes the insert 16 off to a bottom side.

Figure 2:
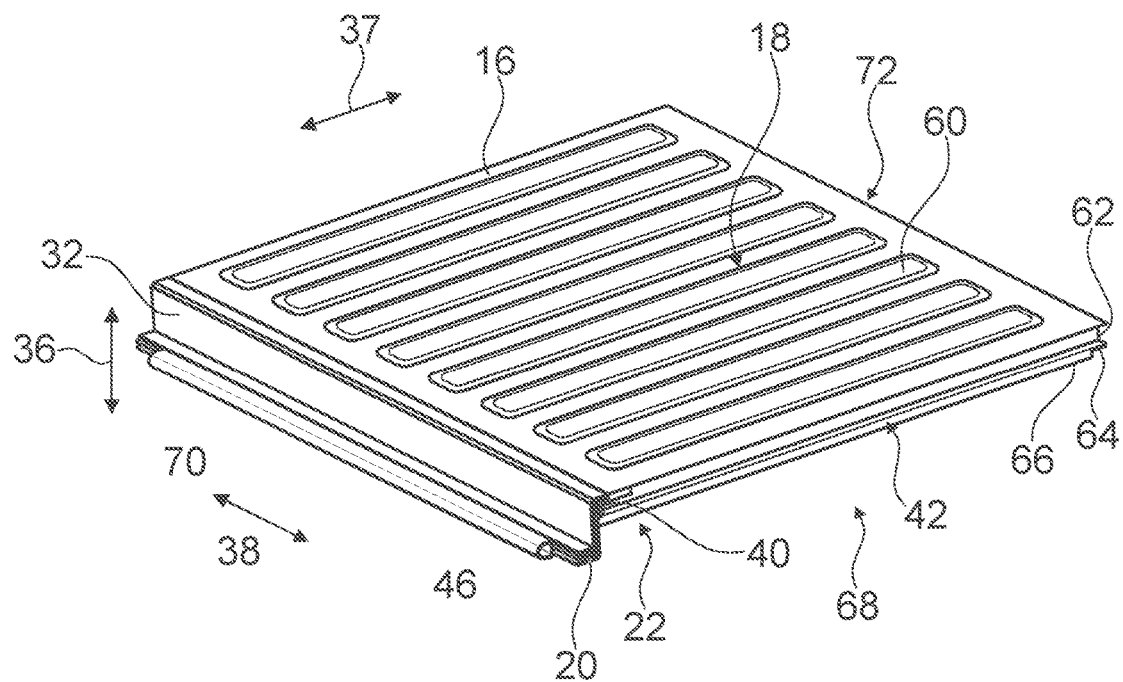
Figure 3:
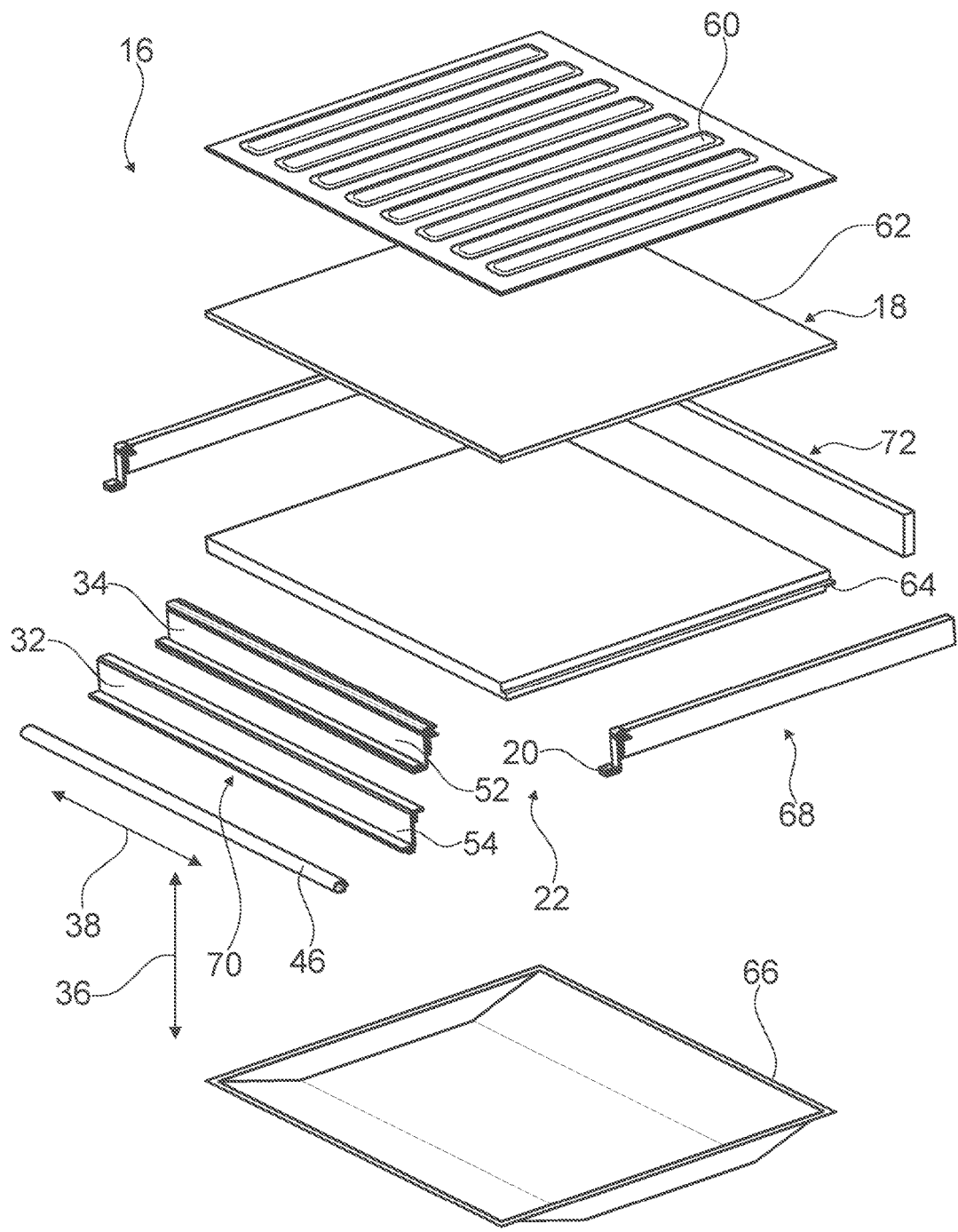

FIGS. 2-3 show a portion of the home appliance device in different views. The insert 16 comprises a frame 68. The frame 68 is configured for mounting the insert 16 to the housing 10, in particular to the inner liner 59. Further the frame 68 is configured for connecting further components of the insert 16 to one another. The frame 68 comprises a front frame element 70. The frame 68 comprises a rear frame element 72. The frame 68 comprises a lateral frame element 42. The frame 68 comprises a further lateral frame element situated opposite the frame element 42. For the sake of clarity, in the following only one lateral frame element 42 is given a reference numeral and is described in detail.

The front frame element 70 comprises a cover support element 34. The cover support element 34 is configured for supporting a front cover element 32. The cover support element 34 comprises a uniform cross-section along its main extension direction. The cover support element 34 is made of plastic. Alternatively or additionally the cover support element 34 may be at least partly made of metal, wood and/or glass. The cover support element 34 is manufactured by extrusion, in particular plastic extrusion.

The front frame element 70 comprises the front cover element 32. The front cover element 32 is configured for covering a front side of the insert 16. The front cover element 32 covers at least partly the cover support element 34 and/or the base unit 18. The front cover element 32 faces a home appliance door 14 of the home appliance device. The front cover element 32 has a main extension which is longer than a main extension of the cover support element 34. The front cover element 32 has a uniform cross-section along its main extension direction. The front cover element 32 is made of metal. Alternatively or additionally the front cover element may be at least partly made of plastic, wood and/or glass. The front cover element 32 and/or the cover support element 34 are manufactured by extrusion, in particular metal extrusion.

The main extension of the front cover element 32 and/or the cover support element 34 are/is at least substantially perpendicular to a first direction 36. The first direction 36 is in an installed state in particular at least substantially perpendicular to the main extension of the insert 16. The main extension of the front cover element 32 and/or the cover support element 34 is/are at least substantially parallel to a second direction 38. The second direction 38 is in an installed state in particular at least substantially parallel to the main extension of the insert 16. Further the main extension of the front cover element 32 and/or of the cover support element 34 are/is at least substantially perpendicular to a third direction 37. The third direction 37 is at least substantially perpendicular to the first direction 36 and the second direction 38.

The front cover element 32 is connected to the cover support element 34 in the first direction 36 in a form-fit manner. Further the front cover element 32 is connected to the cover support element 34 in a form-fit manner in the third direction 37. Alternatively or additionally the front cover element 32 may be connected to the cover support element 32 in a force-fit manner as well as by substance-to-substance bond, preferably by an adhesive and/or cohesive connection. The front cover element 32 is in at least one pre-assembly state movable with respect to the cover support element 34 in the at least one second direction 38.

Figure 4:
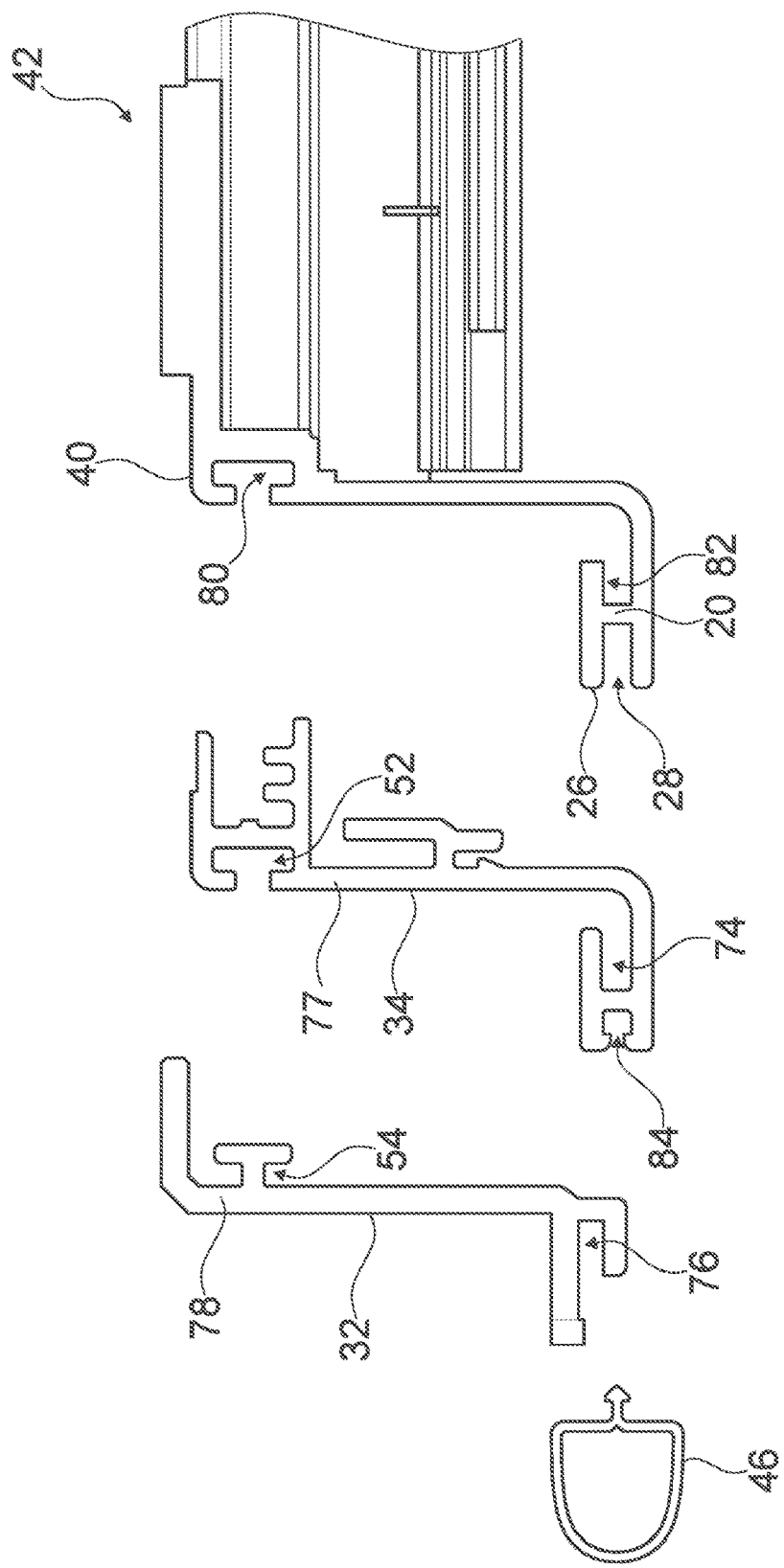
Figure 5:
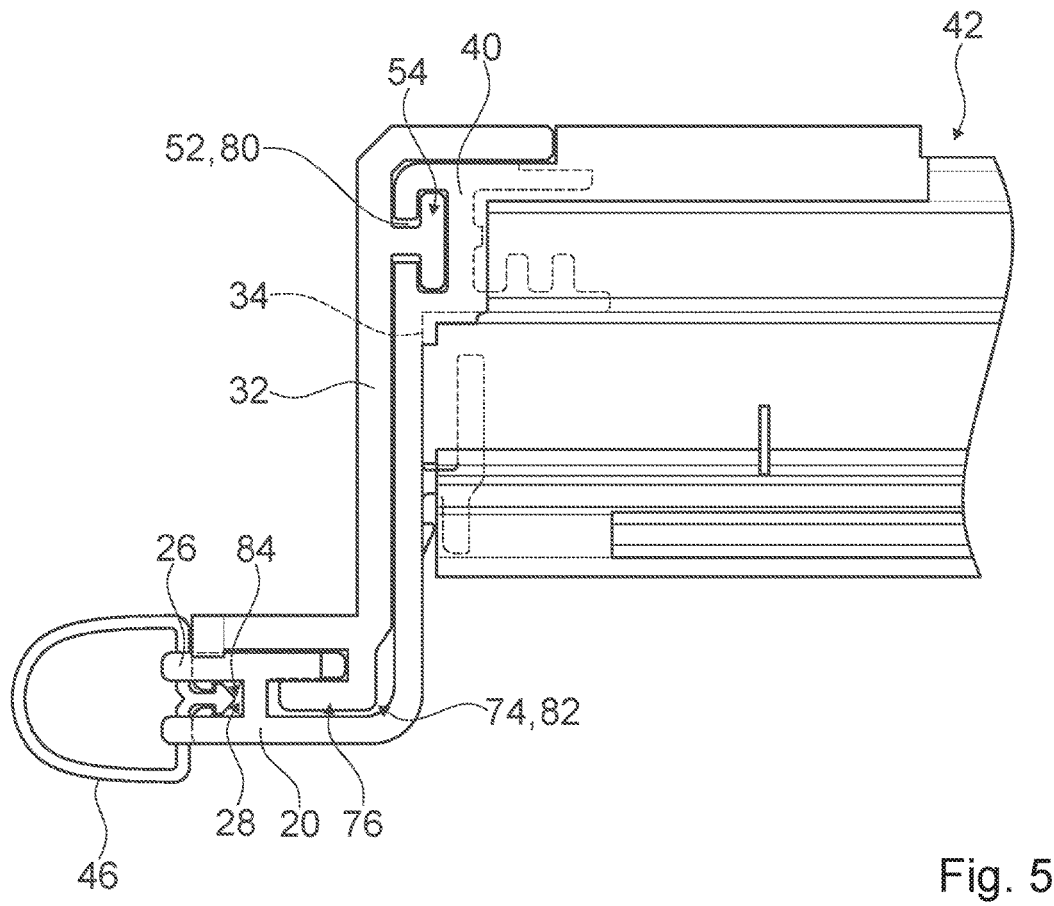
Figure 6:
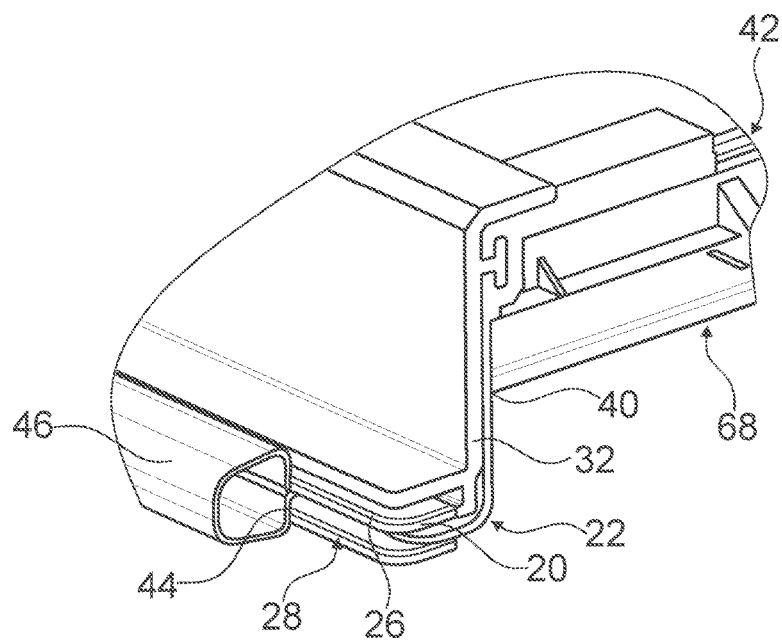

FIGS. 4-6 show different views of the frame 68 of the home appliance device in an assembled and dissembled state of the frame 68. A cross-section of the front cover element 32 is at least partly shaped correspondingly to a cross-section of the cover support element 34. The cover support element 34 comprises a first guiding element 52. The front cover element 32 comprises a corresponding second guiding element 54. The first guiding element 52 has a uniform cross-section along the main extension direction of the cover support element 34. The second guiding element 54 has a uniform cross-section along the main extension direction of the front cover element 32. The first guiding element 52 and/or the second guiding element 54 has/have at least partly an at least substantially T-shaped cross-section. The first guiding element 52 and the second guiding element 54 cooperate to connect the front cover element 32 to the cover support element 34 in a form-fit manner. A projection of the first guiding element 52 in a main extension direction of the cover support element 34 and a projection of the second guiding 54 element in a main extension direction of the front cover element 32 are shaped at least substantially complementarily. In an installed state of the front cover element 32, the first guiding element 52 and the second guiding element 54 contact each other along their respective main extensions multiple times. In an installed state of the front cover element 32, most of a surface of the cover support element 34, preferably of the first guiding element 52, which faces the front cover element 32, contacts at least mostly a surface of the front cover element 32, in particular of the second guiding element 54, which faces the cover support element 34.

The cover support element 34 comprises a further first guiding element 74. The further first guiding element 74 is embodied at least substantially equivalently to the first guiding element 52. In particular, the description regarding the first guiding element 52 may be applied to the further first guiding element 74. The further first guiding element 74 differs from the first guiding element 52 by its cross-section. The cross-section of the further first guiding element 74 is at least substantially L-shaped. The further first guiding element 74 differs from the first guiding element 52 by its position at the cover support element 34.

The first guiding element 52 and/or the further first guiding element 74 are/is integrally implemented with each other. The cover support element 34 comprises in particular a base body 78. The base body 78 embodies the first guiding element 52. The base body 78 embodies the further first guiding element 74.

The front cover element 32 comprises a further second guiding element 76. The further first guiding element 74 is embodied at least substantially equivalently to the second guiding element 54. In particular, the description regarding the second guiding element 54 may be applied to the further second guiding element 76. The further second guiding element 76 differs from the second guiding element 54 by its cross-section. The cross-section of the further second guiding element 76 is at least substantially L-shaped. The further second guiding element 76 differs from the second guiding element 54 by its position at the front cover element 32.

The second guiding element 54 and the further second guiding element 76 are implemented integrally with each other. The front cover element 34 comprises a base body 78. The base body 78 embodies the second guiding element 54. The base body 78 embodies the further second guiding element 76.

The lateral frame element 42 comprises a lateral element 40. The lateral element 40 at least partly embodies the lateral frame element 42 of the insert 16. The lateral element 40 is connected to the front cover element 32 in a form-fit manner. Further the lateral element 40 is connected to the front cover element 32 in a force-fit manner. The lateral element 40 is connected to the front cover element 32 in the first direction 36. The lateral element 40 is connected to the front cover element 32 in the third direction 37. In a pre-assembly state the lateral element 40 is movable with respect to the cover support element 34 in the second direction 38. The main extension of the front cover element 32 is equal to the main extension of the cover support element 34 plus at least twice an extension of the lateral element 40 in parallel to the second direction 38.

The lateral element 40 comprises a third guiding element 80. By means of the third guiding element 80, the lateral element 40 is connected to the front cover element 32. The third guiding element 80 cooperates with the second guiding element 54 of the front cover element 32. The third guiding element 80 is at least substantially shaped correspondingly to the second guiding element 54. The third guiding element 80 is at least substantially shaped equivalently to the first guiding element 52 of the cover support element 34. The description regarding the first guiding element 52 is also applicable to the third guiding element 80.

Further the lateral element 40 comprises a further third guiding element 82. The further third guiding element 82 cooperates with the further second guiding element 76 of the front cover element 32. The further third guiding element 82 is at least substantially correspondingly shaped to the further second guiding element 76 of the front cover element 32. The further third guiding element 82 is at least substantially shaped equivalently to the further first guiding element 74 of the cover support element 34. The description regarding the further first guiding element 74 is also applicable to the further third guiding element 82.

Figure 7:
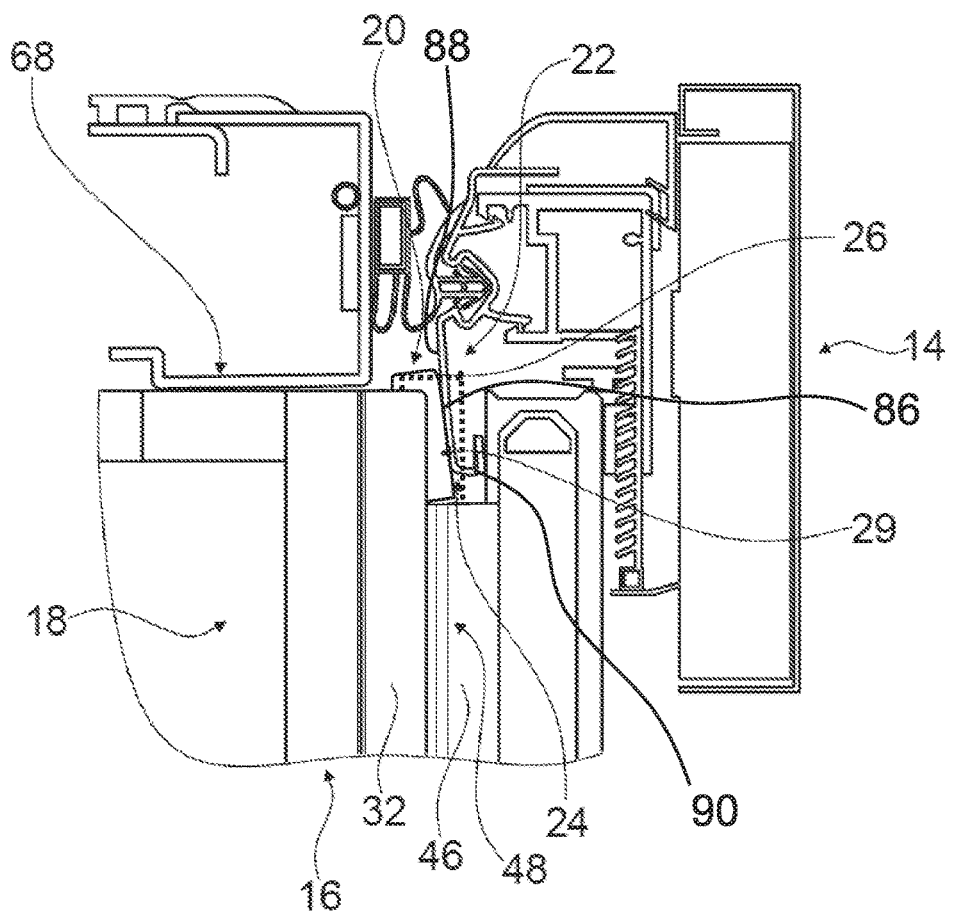

FIG. 7 shows a portion of the home appliance device in a closed state of the home appliance door 14 of the home appliance device, in a cross-sectional view. Between the home appliance door 14 and the base unit 18 there is an intermediate space 48. The insert 16 comprises a seal 46. The seal 46 is provided for sealing the intermediate space 48 between the base unit 18 and a home appliance door 14 in the closed state. The lateral element 40 comprises a stopper 44 for the seal 46 in form of a sealing lip embodied by the insulation element 20. In this case the seal 46 is connected to the cover support element 34. Alternatively or additionally the seal 46 may be connected to the front cover element 32 or to the lateral element 40. The cover support element 34 comprises an additional guiding element 84. The additional guiding element 84 is configured for connecting the seal 46 to the cover support element 34. In assembly the seal 46 is slid inside the additional guiding element 84 in the second direction 38. The seal 46 is fixed between the stopper 44 and a further stopper 44 of the further lateral element 40 of the further lateral frame element. The seal 46 is made of plastic or rubber.

In a vicinity of a corner 22 of the base unit 18 there is a further intermediate space 24 between the base unit 18 and the home appliance door 14. The home appliance device comprises an insulation element 20. The insulation element 20 is implemented integrally with the lateral element 40. The insulation element 20 is arranged in a vicinity of a corner 22 of the base unit 18 in a closed state of the home appliance door 14. The vicinity is a spherical area around the corner 22, which has a radius of at most 2 cm. The insulation element 20 embodies at least partly a corner of the insert 16. The insulation element 20 at least partly insulates the further intermediate space 24 between the base unit 18 and the home appliance door 14 in the closed state. The insulation element 20 has a contact surface 26. The contact surface 26 at least partly contacts the home appliance door 14 in the closed state.

The insulation element 20 is at least partly deformable, in particular elastically deformable. The insulation element 20 is at least partly deformed by the home appliance door 14 in the closed state. The insulation element 20 is at least partly made of a thermoplastic material. The insulation element 20 embodies the stopper 44.

FIG. 7 depicts the closed state of the door 14, which is the state once the door is fully closed. In the closed state of the door 14 the insulation element 20 is in a deformed state, in particular a first section of it is pushed backwards, that is away from the door and the first section of the insulation element on which a contact surface 86 is embodied is also tilted. The contact surface 86 is in the closed state of the door in contact with a contact surface 88 of the door 14. The contact surface 88 is embodied on a frame 90 of the door. Both contact surfaces 86, 88 are in line contact in FIG. 7, that means due to an extension of both the insulation element 20 and the frame 90 in a vertical direction, that is in the first direction, there is a surface contact between both contact surfaces 86, 88. This improves the sealing effect.

For illustrative purposes FIG. 7 depicts also the undeformed state of the insulation element 20 with dotted lines. This undeformed state is embodied by the insulation element 20 in an opened state of the door 14. Due to the deformability of the insulation element 20 it will always contact the door 14, e.g. the frame of the door in this embodiment, via a large contact surface, e.g. a surface contact rather than a point or line contact.

Further the insert 16 comprises a sealing element 29. The insulation element 20 comprises a recess 28. The recess 28 is configured for receiving the sealing element 29 of the insert 16. Alternatively or additionally the sealing element may be integrally implemented with the insulating element. The sealing element 29 has a greater deformability than the insulation element 20.

The following is a summary list of reference numerals and the corresponding structure used in the above description of the invention:

10 Housing
12 Storage space
14 Home appliance door
16 Insert
18 Base unit
20 Insulation element
22 Corner
24 Further intermediate space
26 Contact surface
28 Recess
29 Sealing element
32 Front cover element
34 Cover support element
36 First direction
37 Third direction
38 Second direction
40 Lateral element
42 Lateral frame element
44 Stopper
46 Seal
48 Intermediate space
50 Home appliance
52 First guiding element
54 Second guiding element
56 Base
58 Horizontal plane
59 Inner liner
60 Deposition element
62 Base support element
64 Insulation element
66 Bottom cover
68 Frame
70 Front frame
72 Rear frame
74 Further first guiding element
76 Further second guiding element
77 Base body
78 Base body
80 Third guiding element
82 Further third guiding element
84 Additional guiding element
86 Contact surface
88 Contact surface
90 Frame

The invention claimed is:

1. A home appliance device comprising:
a housing defining a storage space; a home appliance door configured for closing off the storage space;
an insert which is insertable into the storage space and divides the storage space into storage areas;
wherein said insert has a base unit, a seal, and an insulation element arranged in a vicinity of a corner of the base unit in a closed state of the home appliance door, wherein said seal is arranged along a length of said insert and at least partly engages the home appliance door and at least partly insulates an intermediate space between the base unit and the home appliance door in a closed state of the door, wherein the insulation element at least partly insulates a further intermediate space laterally of said seal between the base unit and the home appliance door in the closed state of the door; and
wherein the insulation element is made at least partially of a flexible hard plastic which flexes when contacted by the door in the closed state, and the seal is a different material than the insulation element.

2. The home appliance device according to claim 1, the insulation element having a contact surface which at least partly contacts the home appliance door in the closed state.

3. The home appliance device according to claim 1, the insulation element being at least partly deformable and being at least partly deformed by the home appliance door in the closed state.

4. The home appliance device according to claim 1, the insulation element at least partly embodying a corner of the insert.

5. The home appliance device according to claim 1, the insulation element comprising a recess which is configured for receiving the seal of the insert.

6. The home appliance device according to claim 5, the seal having a greater deformability than the insulation element.

7. The home appliance device according to claim 1, the insert having a front cover element and a cover support element, wherein the front cover element is connected to the cover support element in a form-fit manner in at least one first direction and is in at least one pre-assembly state movable with respect to the cover support element in at least one second direction that is perpendicular to the first direction.

8. The home appliance device according to claim 7, the insert comprising a lateral element which at least partly embodies a lateral frame element of the insert.

9. The home appliance device according to claim 8, the lateral element comprising a stopper for a sealing lip of the insert, wherein the sealing lip is connected to the front cover element or to the cover support element.

10. The home appliance device according to claim 9, the insulation element embodying the stopper at least partly.

11. A home appliance comprising a home appliance device according to claim 1.

12. The home appliance device according to claim 9, wherein said home appliance device is a home chiller appliance.

13. A home appliance device comprising:
a housing defining a storage space; a home appliance door configured for closing off the storage space;
an insert which is insertable into the storage space and divides the storage space into storage areas;
wherein said insert has a base unit and an insulation element arranged in a vicinity of a corner of the base unit in a closed state of the home appliance door, wherein the insulation element at least partly insulates a further intermediate space between the base unit and the home appliance door in the closed state; and wherein the insulation element is made at least partially of a flexible hard plastic which flexes when contacted by the door in the closed state, and the insulation element has a recess which is configured for receiving a sealing element of the insert.

\* \* \* \* \*